Jan. 16, 1940.  D. D. ORMSBY  2,187,614
AXLE CONSTRUCTION
Filed March 22, 1937  4 Sheets-Sheet 1
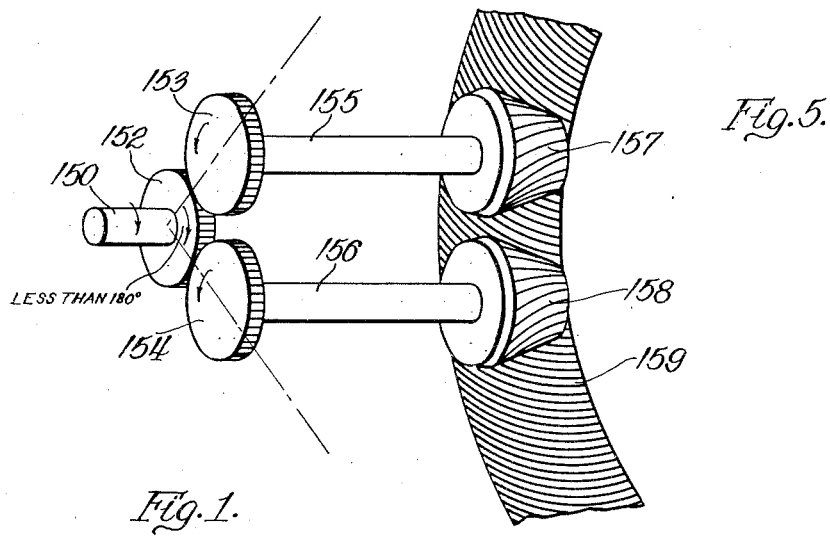
Fig.5.
Fig.1.
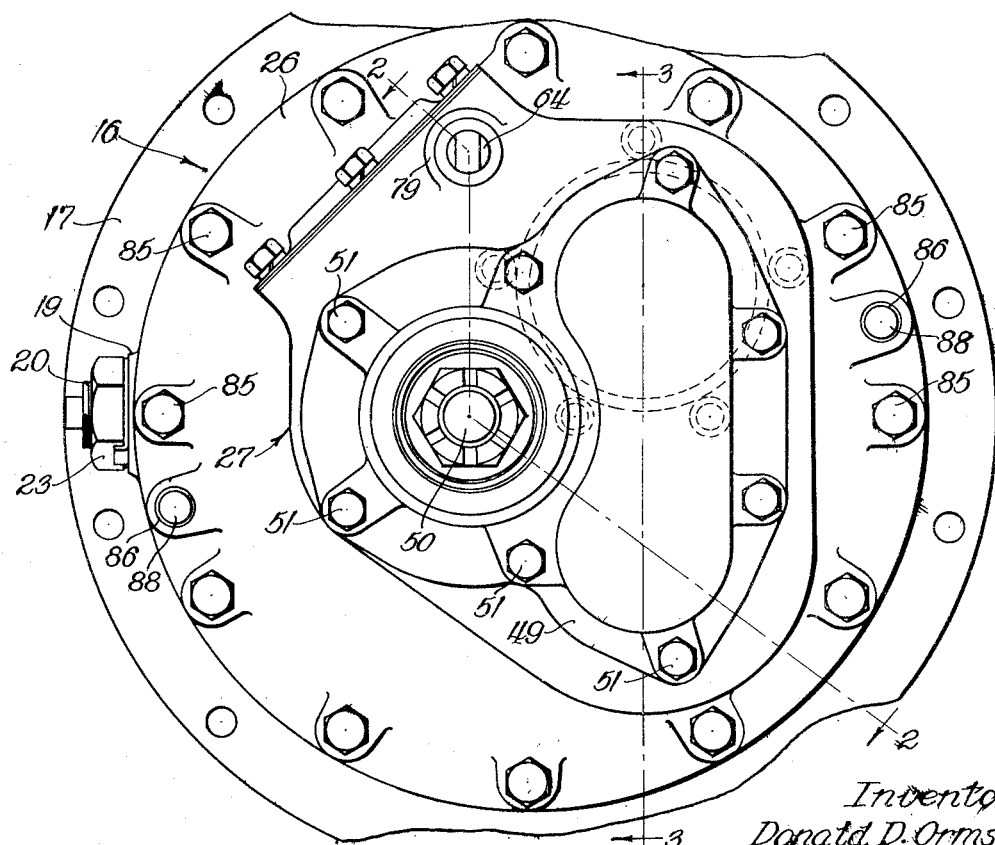
Inventor
Donald D. Ormsby
By Brown, Jackson, Boettcher & Dienner
Attys Jan. 16, 1940.                D. D. ORMSBY                2,187,614
                            AXLE CONSTRUCTION
                          Filed March 22, 1937          4 Sheets-Sheet 3

Inventor
Donald D. Ormsby
By Brown Jackson Boettcher Dienner
attys

Jan. 16, 1940.  D. D. ORMSBY  2,187,614
AXLE CONSTRUCTION
Filed March 22, 1937   4 Sheets-Sheet 4

Inventor
Donald D. Ormsby
By
attys

Patented Jan. 16, 1940

2,187,614

UNITED STATES PATENT OFFICE 2,187,614

AXLE CONSTRUCTION

Donald D. Ormsby, Niles, Mich., assignor to Clark Equipment Company, Buchanan, Mich., a corporation of Michigan Application March 22, 1937, Serial No. 132,264

18 Claims. (Cl. 74—326)

This invention relates to driving means, and more particularly is directed to driving means for transmitting torque from a power shaft to a driven gear member in such manner that the unit tooth pressure on the driven member is materially reduced, which allows the use of smaller gears for torque loads of the same amount as heretofore employed, or allows for an increase in torque loads of present driving assemblies without a corresponding increase in gear size.

While the invention is especially adapted for driving axle assemblies of motor vehicles such as trucks, buses and the like, and has been illustrated in connection therewith, I do not intend to be limited to this particular application since the invention is equally well adapted for other constructions where problems of gear size, torque loads, and unit tooth pressures are encountered.

Broadly stated, the present invention contemplates a driving arrangement wherein a ring gear is driven from a power shaft extending normally to the axis thereof through parallel intermediate shafts, having independent engagement with the ring gear and clutched simultaneously to the power shaft for conjoint rotation in the same direction. In a specific embodiment of this general concept, a ring gear of the hypoid or skew type is driven from a plurality of hypoid or skew pinions carried on independent parallelly extending shafts which in turn parallel the main shaft on one side thereof. Suitable clutch means is provided for simultaneously coupling the power shaft to the intermediate shafts to produce conjoint rotation of the intermediate shaft in the same direction.

By the use of the present arrangement, I am able to reduce the tooth pressure on the ring gear to an extent hitherto unattainable in structures of this type, since the ring gear is driven from two pinions and consequently, the torque load is divided, thereby placing this load on two or more sets of teeth of the ring gear instead of a single set of teeth. As a result, the unit tooth pressure is substantially one-half of that formerly attainable where two driving pinions are employed, thereby providing for transmission of substantially twice the normal torque load to the ring gear. Considered in another manner for a given torque load, the size of the ring gear can be substantially reduced. This is of distinct advantage in structure such as drive axle assemblies and the like, where the diameter of the ring gear on the differential case must be kept within predetermined limits due to the size of axle housing and the requirements for road clearance, as well as resulting in economy of construction due to reduction in the size of the constituent parts.

One of the primary objects of the present invention is to provide in combination with a drive shaft and a ring gear, a pair of parallelly disposed intermediate shafts with pinion means thereon having meshing engagement with the ring gear, the intermediate shafts being conjointly coupled to the driving shaft for transmitting and dividing driving torque to the ring gear.

Another object of the present invention is to provide a driving assembly of this type in which the intermediate shafts may be made adjustable in order to produce equal division of torque, and thereby prevent any overload on one of the intermediate shafts. This is accomplished by providing for adjustment of these shafts in order to move the shafts relative to the ring gear so that no unequal backlash is present in the driving connection.

Another object of the present invention is the provision of a simplified arrangement for selectively varying the speed ratio between the power shaft and the driven gear through suitable clutch means carried by the power shaft.

A still further advantage of the present invention resides in means providing for automatic floating of the intermediate shafts with respect to the ring gear in such manner that the shafts will find an intermediate position wherein both shafts are transmitting substantially equal driving torque to the driven gear.

A still further feature of the invention resides in the provision of a structure which is compact in arrangement and which is so designed as to reduce overhang of the driving means with respect to the driven assembly, while still retaining all the desired features of selectivity of speed ratio and balancing of the thrusts on the gear members.

Other objects and advantages of the present invention will appear more fully from the following detailed description which, taken in conjunction with the accompanying drawings, will disclose to those skilled in the art the particular construction and operation of preferred forms of the present invention.

In the drawings:

Figure 1 is an end elevational view of an assembly embodying the present invention;

Figure 4 is a partial sectional view of a modified form of the invention; and

Figure 5 is a somewhat diagrammatic view of driving means embodying the principles of the present invention.

Figure 2:
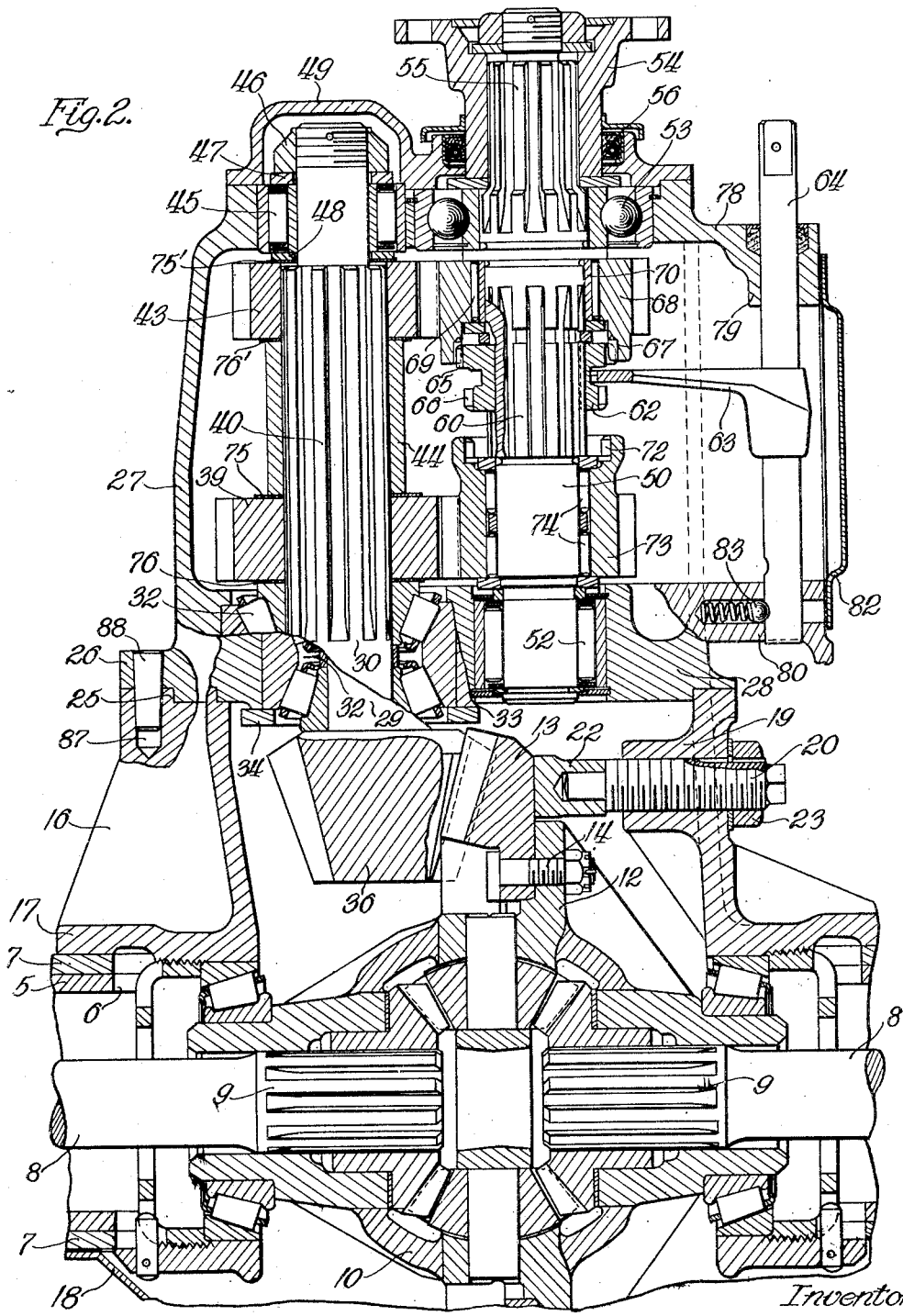
Figure 2 is a sectional view through the structure shown in Figure 1 taken substantially on the line 2—2 of Figure 1.

Referring now in detail to the drawings, in which I have illustrated the invention as applied to a conventional rear axle assembly for a motor vehicle or the like, the rear axle housing is indicated at 5 and is provided with a central banjo opening of substantially transverse cylindrical form indicated at 6, the housing 5 having suitable reinforcing rings 7 secured about the defining edges of the opening 6 in the usual manner.

The extending arms of the housing are adapted to receive the oppositely extending axle shafts 8 which have the splined ends 9 suitably received within a differential casing 10, which may be of standard construction and which is provided with the flange portion 12 carrying a ring gear 13, this ring gear being preferably a hypoid or skew beveled gear secured to the flange 12 by means of a series of bolts 14.

A suitable differential carrier is indicated at 16 and has a flange portion 17 which may be suitably secured to one face of the banjo frame of the housing 5 in any suitable or desired manner. The opposite portion of the banjo opening is closed by a back closure plate 18 which may be bolted or welded to the ring members 7 as desired.

The carrier 16 is provided with a suitable boss portion 19 through which is threaded an adjusting stud 20 carrying a back-up or supporting shoe 22 at its inner end for supporting the ring face of the ring gear 13 against distortion under heavy torque loads. The stud 20 is adjustable within the carrier 16 and is locked in place by a lock nut member 23 threaded thereover and engaging the outer face of the boss 19. The shoe 22 is loose on the stud 20 and is formed of suitable wear-resisting material in order to accommodate any wear between the face of the gear 13 and the shoe when the gear is distorted out of position under heavy torque loads.

The extending end of the carrier 16 is provided with the pilot shoulder 25 in which is piloted the end flange 26 of a suitable housing 27 carrying the driving means of the present invention. The housing 27 carries radially within the flange portion 26 a suitable journal flange 28 adapted to form journals for the intermediate shafts 29 and 30.

Each of the shafts 29 and 30 is suitably mounted in the journal flange 28 by means of double tapered bearings, indicated generally at 32, which are held in position against shoulders 33 formed at the inner portion of the journal 28, and which are retained against outward movement by the bearing retaining plate 34 bolted to the end face of the housing 27 by the studs 35.

Each of the shafts 29 and 30 is provided at its forward end with a hypoid or skew pinion portion 36 and 37, respectively, adapted to have meshing engagement with the teeth of the ring 13. The inner bearing races are held against movement in one direction by engagement with the radial faces of the pinions 36 and 37, and at their opposite end are engaged against the faces of gears 38 and 39, respectively, which are mounted upon the splines 40 of the shafts 29 and 30.

It will be noted that the intermediate shafts 29 and 30 are disposed in the same vertical plane and extend parallel to each other in a direction normal to the axis of the gear 13. It will also be noted that the gears 38 and 39 at the forward ends of these shafts are not in meshing engagement, but are spaced apart slightly, as indicated at 42. The rear end of each of the shafts 29 and 30 is provided with a second gear member indicated in Figure 2 at 43, also splined to the shaft and spaced from the gear members 38 and 39 by cylindrical sleeve spacing members 44 extending along the intermediate portion of the shaft.

The rear ends of the shafts 29 and 30 are journaled in suitable roller bearings 45 carried by the rear portion of the housing 27, the shafts being held against displacement by means of the end nut 46 threaded on to the rear ends thereof for clamping the inner bearing race between the rings 47 and 48. A suitable bearing cap 49 is secured, by means of bolts 51 over the end of the housing 27 to enclose the ends of the shafts 29 and 30. The gears 43 on the shafts 29 and 30 are disposed out of meshing engagement, and are reduced in diameter with respect to the gears 38 and 39 to provide a different driving ratio to the driven gear 13.

Extending axially into the housing 27 and spaced laterally of the plane of the shafts 29 and 30, is the power or driving shaft 50 which, at its forward end, is carried in suitable roller bearings 52 mounted in the journal 28 of the housing 27, and at its rearward end is journaled in the ball bearing assembly 53 carried in the rear flange of the housing 27. A suitable universal coupling yoke 54 is secured in splined engagement with the splined end 55 of the power shaft which projects outwardly through the bearing cap 49, and a suitable oil sealing means 56 is disposed in an outwardly opening recess of the bearing cap about the annular surface of the hub of the yoke 54. The power shaft is thereby connected through the member 54 to any suitable driving shaft such as the propeller shaft of a motor vehicle or the crankshaft of an engine or the like.

The shaft 50 is provided in its central portion with a splined section 60 carrying a clutch collar 62 thereon, which is axially movable upon the splines by shifting movement of the clutch yoke 63 carried by the shifter rod 64. The clutch collar 62 is provided with two clutch sections 65 and 66, respectively, the clutch section 65 being adapted to mesh with internal clutch teeth 67 carried by the gear member 68 loosely mounted with respect to the shaft 60 by roller bearings 69 on the bearing sleeve 70. The clutch section 66 is adapted to engage with internal clutch teeth 72 carried by the gear member 73 supported by suitable needle bearings 74 upon a cylindrical portion of the shaft 50. Each of the gears 68 and 73 is prevented from axial movement by suitable stop rings secured to the shaft. The gear 68 is adapted to have simultaneous meshing engagement with the gears 43 at the rear ends of the intermediate shafts 29 and 30 and the gear 73 is adapted to have simultaneous meshing engagement with gears 38 and 39 at the forward ends of these shafts, and the shaft 50 is selectively clutched to either gear 68 or gear 73 by the clutch collar 62.

It will be apparent that the rotation of the gear 68 when clutched to the shaft 50, will produce simultaneous rotation of both gears 43 on each of the shafts 29 and 30, the gears 43 being rotated in the same direction and producing conjoint rotation of the two intermediate shafts. As a result, the two pinions 36 and 37 of these shafts will rotate in the same direction to drive the ring gear 13 for rotating the differential case. Since the gears 43 are of equal diameters and have an equal number of teeth, it will be apparent that the two pinions 36 and 37 are driven at the same speed and impart substantially equal driving force to the ring gear 13 through two sets of teeth, thus reducing the unit tooth pressure to substantially half of that formerly present in a construction of the type in which only a single pinion was engaged with the ring gear.

Each of the shafts 29 and 30 is provided with a plurality of shims 75 and 76 on opposite sides of the gears 38 and 39 and held against the lateral faces of the gears by the spacer sleeves 44 and by the inner races of the bearing assemblies 32. It should be pointed out that the gears 38, 39 and 43 are all helical gears, and consequently, axial movement of any one of these gears with respect to the corresponding driving gear 68 or 73 on the power shaft will result in advancing or retarding the circumferential driving engagement. In other words, due to the inclination of the teeth on these gears, if one gear of either pair of interengaging gears is moved axially relative to its associated gear, the tooth surface advances circumferentially and therefore produces a corresponding rotational advance of the shaft thus advancing the associated pinion into pressure engagement with the teeth of the ring gear. The direction of axial movement will determine the increase or decrease of pinion tooth pressure so that the same pressure can be executed at both pinions. Thus, by shifting the shims 75 and 76, after the assembly has been initially mounted in position for test, the gears 38 and 39 can be selectively shifted axially for final assembly in order to take up any possible inaccuracies of manufacture, the axial shifting of these gears resulting in a circumferential movement at the periphery of the gears with respect to the driving gear 73 in order that the backlash be equally distributed between the two pinions 36 and 37 so that these pinions will be balanced and will transmit equal driving effort to the ring gear 13. Similarly, shims 75' and 76' provide a corresponding adjustment of the gears 43 relative to the gear 68.

In the assembly of the construction, the pinions 36 and 37 are lapped into the gear 13 to provide a relatively close meshing engagement therebetween, and to eliminate as far as possible any manufacturing inaccuracies. The gears 38, 39, 43, 68 and 73 are machined within the relatively narrow manufacturing tolerances, and any inaccuracies which would tend to produce an unequal driving force between the pinions and the ring gear can be accommodated by the axial shifting of either of the gears 38 or 39, as the occasion may require. This shifting is accommodated by the movement of the shims 75 and 76 to produce the required axial movement of the gears necessary to take up the unequal backlash to produce the proper distribution of driving torque to the ring gear. The gears 43 are similarly positioned by the shims 75' and 76'.

The shifter mechanism is housed within a suitable extension 78 of the housing 27, carrying boss portions 79 and 80 providing for axial movement of the shifter rod 64, and also carrying a removable cover plate or hand hole opening 82 on the face thereof. Suitable spring pressed detent means 83 is provided for holding the shifter rod in selective shifting position in accordance with the usual practice in the transmission art.

In the construction shown, the housing extension 78 is projected angularly of the housing 27, with the hand hole opening inclined for easy access through the floor boards or the like.

Referring now in more detail to Figures 1 and 2, an optional adjusting arrangement for insuring equal transmission of torque through both pinions, employed in conjunction with the adjusting shims 75, 75', 76 and 76' or independently thereof, is disclosed.

It will be noted that the housing 27, which has the flange 26 thereof secured to the end of the differential carrier by means of a series of circumferentially spaced bolts 85, is provided at diametrically opposed points with tapered openings 86 in the flange thereof. The openings through which the bolts 85 extend are preferably elongated slightly in an arcuate direction, allowing a limited angular displacement of the housing 27 relative to the carrier 16. As a result, the pinions 36 and 37 are moved toward and away from the plane of gear 13, movement of housing 27 in a counter-clockwise direction as viewed in Figure 1 resulting in movement of pinion 36 toward gear 13 and movement of pinion 37 away from gear 13. Clockwise movement of the housing produces opposite movement of the pinions relative to the ring gear.

Thus it will be apparent that the housing 27 can be initially mounted in position, and then rotated until the two pinions 36 and 37 are in proper relation to the ring gear. The bolts 85 are then tightened in position, and the end face of the shoulder 25 of the carrier is reamed in alinement with the tapered openings 86. This forms the tapered recesses 87 in the carrier, and suitable tapered pins 88 are then driven through the holes 86 and into recesses 87 to secure the housing 27 in fixed adjusted position on the carrier. This maintains the housing 27, and consequently the shafts 29 and 30 in position so that equal transmission of torque is effected by the pinions 36 and 37, eliminating the possibility of overload on one of the intermediate shafts.

Figure 3:
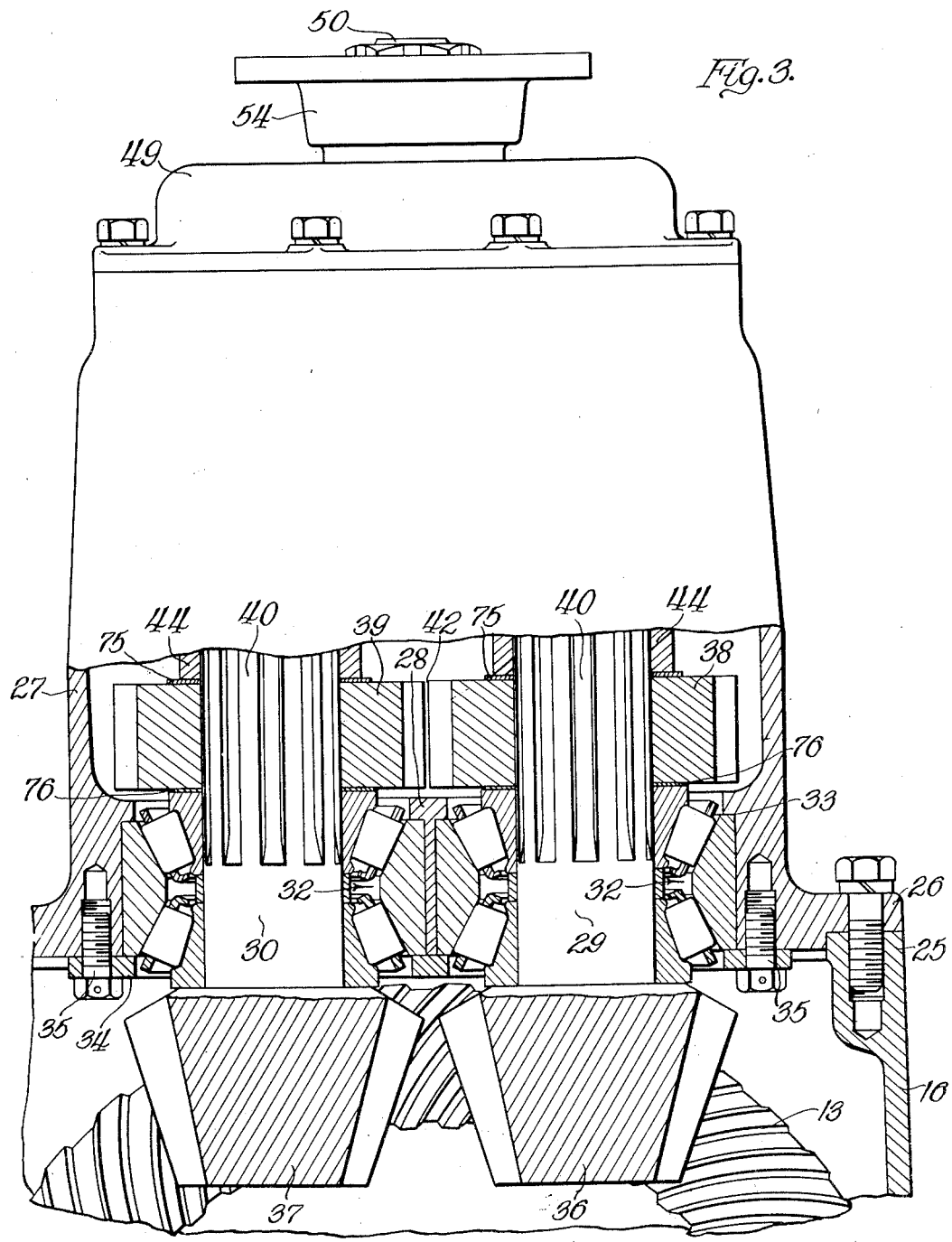
Figure 3 is a view, partially in section, taken substantially on the line 3—3 of Figure 1.

Referring now in detail to the construction shown in Figure 4, I have provided a differential assembly, indicated generally at 100, which is mounted in a suitable axle housing 102 and is provided with the oppositely extending axle shafts 103 extending through the housing arms. The differential assembly 100 is provided with the ring gear 104 corresponding to the ring gear 13 of Figures 1 to 3, and is supported within a differential carrier, indicated generally at 105, the carrier being provided with bearing journal portions 106 holding the differential in fixed position within the banjo opening of the axle housing.

The carrier 105 in the form of the invention shown in Figure 4, is slightly elongated to provide two internal shoulder portions 108 and 109, respectively, which are adapted to form annular pilot shoulders for the housing 110 positioned therein. The housing 110 is adapted to have rotational movement with respect to the shoulders 108 and 109 and is provided at its outer end with a radial flange portion 112 engaging in the shoulder 113 of the carrier 105 to prevent axial movement of the housing 110 with respect to the carrier. A suitable cap plate member 113' closes the end of the carrier 105 and the end of the driving assembly housing 110, and is securely bolted to the end face of the carrier 105 by means of a plurality of cap bolts 114. The plate 113 is provided with a bearing retaining shoulder portion 115 carrying a suitable oil seal ring 116 and forming a retaining shoulder for the cylindrical end flange portion 117 of the bearing retaining plate 118 secured by the studs 119 to the end face of the housing 110. Thus, the housing is free to rotate with respect to the end cap 113, and is trunnioned for rotation within the annular surfaces formed by the shoulders 108 and 109.

A suitable power shaft 120 connected to any suitable power mechanism such as an engine or the like, through the universal coupling yoke member 122 engaging the end splines of the shaft, extends into the housing 110 and is suitably supported therein at its rear end by bearings 123. The forward end of the shaft 120 is supported within the forward portion of the housing 110 by means of roller bearings corresponding to the bearings 52 of Figure 2. Suitable oil retaining means 124 is provided between the bearing retaining plate 118 and the hub of the universal coupling member 122.

A pair of intermediate shafts 125 are mounted in vertically spaced parallel alignment in the housing 110 in a manner corresponding to the manner in which the shafts 29 and 30 of Figure 2 are mounted in the carrier member 27. Thus, the shaft 125, visible in Figure 4, is supported at its rear end by roller bearings 126 carried by the journal web 127 at the outer end of the housing 110. The forward ends of the shafts 125 are similarly supported upon tapered roller bearings corresponding to the bearings 32 of Figures 2 and 3. Adjacent the bearing support for the forward ends of the shafts 125, and projecting forwardly of the housing 110 are the drive pinions 128 carried at the end of each of the shafts 125 and having driving engagement with the ring gear 104. A suitable bearing retaining plate 129 is bolted to the front end face of the housing 110 and corresponds to the retaining plate 34 of Figure 2.

Each of the shafts 125 is provided adjacent its rear bearing support with gear members 130 mounted upon the splines 132 of these shafts, the gear members 130 being free of engagement of each other, but both being simultaneously engaged by the gear member 133 freely supported by the roller bearings 134 upon a bearing sleeve 135 extending over the splined portion 136 of the power shaft 120. The gear 133 corresponds in construction to the gear member 68 of Figure 2, and is adapted to be clutched to the shaft 120 in a similar manner by a clutch collar corresponding to the clutch collar 62 and operated through a shifter rod 137 carried by the end plate 113 in a suitable boss 138 and extending through an enlarged opening 139 in the journal flange 127 of the housing 110. The shifter rod 137 is axially shiftable to clutch either the gear 133 to the shaft 120 or to clutch a gear corresponding to the gear 73 to the shaft 120 when a low speed drive is desired from the power shaft to the intermediate shafts 125.

The remaining construction and mounting of the shafts within the housing 110 is similar to that described in connection with Figure 2, the shafts 125 each being provided with gears corresponding to the gears 38 and 39 of Figure 2 spaced from the gears 130 by spacer sleeves such as indicated at 44 in Figure 2.

The rotatable mounting of the housing 110 within the carrier 105 is of distinct advantage in providing for automatic adjustment of the driving engagement between the pinions 128 and the ring gear 104, whereby if one pinion is carrying more than half of the load, the housing 110 will rotate a sufficient distance within the carrier 105 to bring the other pinion 128 into equal driving engagement with the ring gear 104. This rotation in nowise affects the transmission of power from the shaft 120 to the intermediate shafts 125 since both the shaft 120 and the intermediate shafts are supported solely by the intermediate housing 110 and rotate conjointly therewith, independently of the fixed bearing cap 113. This construction therefore automatically compensates for any possible manufacturing tolerances in the gear train connections between the shafts 120 and 125, and insures that the torque will be equally divided at all times between the two pinions 128 meshing with the ring gear 104. This arrangement therefore accomplishes the same purpose as the adjustment of the shims 75, 75', 76 and 76' in the construction shown in Figure 2, but is of distinct advantage in insuring that the adjustment will be maintained during operation, which is not possible in the construction shown in Figure 2.

In Figure 5 I have shown, more or less diagrammatically, the present drive arrangement in its broader aspects, since the invention is equally applicable to driving connections other than in connection with rear axles and differential mechanisms.

In this figure I have provided a power shaft 150, which receives torque from any suitable power source, such as an engine, electric motor, turbine or the like. The shaft 150 is provided with a driving gear 152 conjointly rotatable therewith either directly or through suitable clutch means. The gear 152 is in constant meshing engagement with similar gears 153 and 154, carried on intermediate shafts 155 and 156, respectively, which shafts are in spaced parallel relationship.

It should be noted that the included angle from the axis of shaft 156 through the axis of shaft 150 and the axis of shaft 155 is less than 180°, thereby insuring that shafts 155 and 156 are conjointly rotated in the same direction.

Each of the shafts 155 and 156 is provided with a driving pinion, indicated at 157 and 158, respectively, which pinions are preferably of the hypoid or skew type, and which are conjointly rotatable in driving engagement with a coacting gear 159 connected to the load. Thus it is apparent that the torque applied to gear 159 is transmitted equally thereto by the pinions 157 and 158, so that two sets of teeth are in constant driving engagement, consequently reducing the unit tooth pressure to approximately half of that necessary with a single pinion drive.

By providing two identical gears 153 and 154, mounted on parallel shafts so disposed with respect to the power shaft that the included angle is less than 180°, I am able to thus divide the torque equally between the shafts, reducing the unit tooth pressure on the gear under load, and thus allowing either an increase in torque loading, or a decrease in the size of the ring gear.

I am aware that various changes and modifications may be made in the illustrated embodiments of the present invention without departing from the underlying principles thereof, and I therefore do not intend to limit the invention except as defined by the scope and spirit of the appended claims.

I claim:

1. In combination, a drive shaft, a pair of parallelly disposed intermediate shafts disposed in a vertical plane on one side of said drive shaft, a ring gear, pinion means integral with corresponding ends of said intermediate shafts and having meshing engagement with the same lateral face of said ring gear, and means on said driving shaft for transmitting driving torque to both said intermediate shafts.

2. In combination, a ring gear having gear teeth on one lateral surface thereof, a pair of pinions having simultaneous driving engagement with the teeth on said lateral surface of said gear on one side of a vertical plane through the axis of said gear, a main power shaft, and means carried by said power shaft for effecting rotation of both of said pinions in the same direction to transmit driving torque to said driven gear.

3. In combination, a rotatably mounted driven gear, a pair of vertically spaced pinions meshing therewith and having parallelly extending vertically spaced drive shafts disposed in a common plane normal to the axis of said driven gear, and having common driving connection to said drive shafts for simultaneously rotating the same to transmit driving torque to said driven gear.

4. In combination, a rotatably mounted driven gear, a pair of vertically spaced pinions meshing therewith and having parallelly extending vertically spaced drive shafts disposed in a common plane normal to the axis of said driven gear, means having common driving connection to said drive shafts for rotating the same to transmit driving torque to said driven gear, and means for adjusting the meshing engagement between said pinions and said driven gear whereby both said pinions transmit equal driving torque to said driven gear.

5. In combination, a ring gear, a main shaft extending normal to the axis of said ring gear, a pair of intermediate shafts disposed parallel to said main shaft and laterally offset on the same side thereof in a common plane normal to the axis of said gear on the tooth side thereof, driving means between each of said intermediate shafts and said ring gear, and means for coupling said main shaft simultaneously to both said intermediate shafts.

6. The combination of claim 5 characterized in the provision of means for selectively varying the driving ratio between said main shaft and said intermediate shafts.

7. The combination of claim 5 characterized in the provision of means for automatically maintaining uniform driving engagement between said intermediate shafts and said driven gear.

8. In combination, a driven gear having laterally extending gear teeth on one side thereof, a main power shaft, a pair of intermediate shafts disposed parallel to said main shaft and lying in a vertical plane extending normal to the axis of said gear on the toothed side thereof, the axes of said intermediate shafts being disposed above and below the horizontal center of said driven gear, common means simultaneously coupling said drive shaft to both said intermediate shafts for producing uni-directional rotation thereof, and means carried by said intermediate shafts having simultaneous driving engagement with said driven gear.

9. In combination, a hypoid ring gear, a pair of hypoid pinions having meshing engagement therewith and having co-planar shafts extending normal to the vertical plane through the axis of said ring gear and laterally away from the ring gear on the same side of said plane, a main drive shaft, and means for simultaneously rotating said pinion shafts in the same direction upon rotation of said drive shaft.

10. In combination, a driven gear, a pair of parallelly extending intermediate shafts having meshing engagement with said gear on one lateral surface thereof, a power shaft for driving both said intermediate shafts, and supporting means for said intermediate shafts rotatable to vary the effective torque transmitted by each of said shafts to said driven gear.

11. The combination of claim 10 characterized in the provision of means for locking said rotatable supporting means in fixed position to insure uniform division of torque therebetween.

12. In a rear axle construction, a differential having a ring gear secured thereto, a power shaft extending toward said differential, radially spaced parallelly extending intermediate shafts driven from said power shaft and having driving engagement with said ring gear, and means for selectively varying the driving ratio between said power shaft and said intermediate shafts.

13. In combination, a power transmitting shaft, a beveled ring gear having a gear surface on one lateral side thereof, and intermediate drive connections therebetween including two parallel shafts positioned on the said lateral side of said ring gear and engaging said gear surface, said parallel shafts being so disposed with respect to the power shaft that the axes thereof produce an included angle of less than 180°.

14. In combination, a rear axle assembly including a differential having a ring gear, a pair of pinions having driving engagement with said gear, parallel intermediate shafts supporting said pinions, a power shaft, and means for operatively connecting said power shaft to said intermediate shafts to produce conjoint unidirectional rotation thereof.

15. In combination, a rear axle assembly including a differential having a ring gear, a pair of pinions having driving engagement with said gear, parallel intermediate shafts supporting said pinions, a power shaft, and means for operatively connecting said power shaft conjointly to said intermediate shafts in different driving ratios for driving said ring gear at different speeds.

16. In combination, a rear axle assembly including a differential having a ring gear, a pair of pinions having driving engagement with said gear, parallel intermediate shafts supporting said pinions, a power shaft, means for operatively connecting said power shaft to said intermediate shafts to produce conjoint unidirectional rotation thereof, and means supporting said shafts and rotatable with respect to said differential to vary the position of said pinions with respect to said ring gear.

17. In combination, a rear axle assembly including a differential having a ring gear, a pair of pinions having driving engagement with said gear, parallel intermediate shafts supporting said pinions, a power shaft, means for operatively connecting said power shaft to said intermediate shafts to produce conjoint unidirectional rotation thereof, and means for conjointly varying the position of said pinion shafts with respect to the plane of said ring gear.

18. In combination, a ring gear having a laterally extending gear surface on one side only thereof, a pair of parallel intermediate shafts extending normal to a vertical plane through the axis of said gear and disposed in a common plane on said one side thereof, means for conjointly rotating said intermediate shafts in the same direction, and pinions on said shafts drivingly engaging circumferentially spaced portions of said gear surface.

DONALD D. ORMSBY.